(12) United States Patent
Covington et al.

(10) Patent No.: US 7,228,680 B2
(45) Date of Patent: Jun. 12, 2007

(54) END OF ROW DETECTION AND COMPACTING SEQUENCE FOR A COTTON HARVESTING MACHINE

(75) Inventors: Michael J. Covington, Bettendorf, IA (US); Tracy R. Archer, West Liberty, IA (US); Timothy A. Meeks, Davenport, IA (US); Dwight D. Lemke, Geneseo, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/449,331

(22) Filed: Jun. 8, 2006

(65) Prior Publication Data

US 2006/0225393 A1    Oct. 12, 2006

Related U.S. Application Data

(62) Division of application No. 11/050,124, filed on Feb. 3, 2005, now Pat. No. 7,107,747.

(60) Provisional application No. 60/557,658, filed on Mar. 29, 2004.

(51) Int. Cl.
*A01D 46/08* (2006.01)
(52) U.S. Cl. ......................................................... 56/28
(58) Field of Classification Search ................ 100/226, 100/145; 340/665, 666; 56/28, 341, 16.6
See application file for complete search history.

(56) References Cited

U.S. PATENT DOCUMENTS

| | | | |
|---|---|---|---|
| 4,136,508 A | 1/1979 | Coleman et al. | 56/208 |
| 4,171,606 A | 10/1979 | Ziegler et al. | 56/10.2 |
| 4,229,799 A | 10/1980 | Herwig | 364/564 |
| 4,437,295 A | 3/1984 | Rock | 56/10.2 |
| 4,553,378 A * | 11/1985 | Fachini et al. | 56/16.6 |
| 4,744,207 A | 5/1988 | Hanley et al. | 56/16.6 |
| 5,463,854 A | 11/1995 | Chmielewski, Jr. et al. | 56/10.2 E |
| 5,704,200 A | 1/1998 | Chmielewski, Jr. et al. | 56/10.2 E |
| 6,041,583 A | 3/2000 | Goering et al. | 56/10.2 E |
| 6,176,779 B1 | 1/2001 | Riesterer et al. | 460/119 |
| 6,208,259 B1 * | 3/2001 | Lemke | 340/665 |
| 6,588,187 B2 | 7/2003 | Engelstad et al. | 56/10.2 E |
| 6,615,570 B2 | 9/2003 | Beck et al. | 56/10.2 E |
| 2002/0178710 A1 | 12/2002 | Engelstad et al. | 56/10.2 E |

* cited by examiner

*Primary Examiner*—Árpád Fábián Kovács
(74) *Attorney, Agent, or Firm*—Michael G. Harms; John William Stader; Stephen A. Bucchianeri

(57) ABSTRACT

An automatic end of row detection and compacting sequence for a cotton harvesting machine which is initiated responsive to the machine ceasing harvesting at the end of a crop row, as represented by a condition such as raising a picker drum of the machine from a harvesting position to a non-harvesting position. Steps of the sequence can include ceasing operation of augers of compactor apparatus located in the cotton receiver are turned off, and moving the compactor apparatus downwardly within a cotton receiver of the machine and against cotton accumulated in the lower region of the receiver, one or more times, for further and better compacting the cotton. Then, when the machine is aligned with a new swath or row and a condition such as the picker unit being lowered to the harvesting position, normal operation of the compactor apparatus can be resumed.

4 Claims, 3 Drawing Sheets

END OF ROW DETECTION AND COMPACTING SEQUENCE FOR A COTTON HARVESTING MACHINE

This divisional application claims priority under 35 U.S.C. § 120 from U.S. patent application Ser. No. 11/050,124 filed on Feb. 3, 2005 now U.S. Pat. No. 7,107,747 by Michael J. Covington et al. with the same title, the full disclosure of which is hereby incorporated by reference. U.S. patent application Ser. No. 11/050,124 claims the benefit of U.S. Provisional Application No. 60/557,658, filed Mar. 29, 2004.

TECHNICAL FIELD

This invention relates generally to a compacting sequence for a cotton module builder or packager on a cotton harvesting machine, and more particularly, to an automatic process for detecting arrival of the machine at a row end or end of a harvesting pass at which harvesting is temporarily ceased, for initiating a process for compacting harvested cotton located in the packager or module builder, then automatically ceasing the compacting process when the harvesting operation is resumed.

BACKGROUND ART

Commonly, known cotton harvesting machines include a basket or other receiver which serves as a compacting chamber for packaging or compacting the harvested cotton into a unitary body or module. Compactor apparatus including a frame supporting at least one auger is typically disposed in an upper region of the basket or other receiver and is modulated downwardly with the auger or augers actuated for distributing the cotton in the basket and then with the augers off compacting it downwardly against a floor of the basket. The packing occurs in process, as the cotton is being harvested and conveyed into the chamber, and is typically initiated from one of three conditions including (1) auger pressure exceeding a threshold limit; (2) a yield signal from a yield monitor reaching a set point; and (3) achieving a count value set by the operator. However, each of these conditions will be present only when the harvesting machine is harvesting, not when the machine is between passes through the field, which would be an ideal time to add compaction cycles so as to better compact the module or body of cotton.

Thus, what is sought is a process for determining an end of row or swath and automatically initiating a compacting sequence, to provide the advantages and overcome one or more of the problems set forth above.

SUMMARY OF THE INVENTION

According to a preferred aspect of the invention, an automatic end of row detection and compacting sequence for a cotton harvesting machine which provides many of the advantages and overcomes many of the problems set forth above, is disclosed.

Generally, as the cotton harvesting machine reaches the end of a swath or row, and the picker drums for harvesting the cotton from the cotton plants are raised, the compacting sequence is automatically initiated. Steps of the sequence include, but are not limited to, turning off or ensuring that augers of compactor apparatus located in the cotton receiver are turned off, or are turned off, then moving the compactor apparatus downwardly within the cotton receiver and against cotton accumulated in the lower region of the receiver, one or more times, for further and better compacting the cotton. Then, when the machine is aligned with a new swath or row and the picker units are lowered to the picking position, normal operation of the compactor apparatus resumes.

As a result, additional compaction cycles are incorporated into the cotton harvesting operation, which has been found to provide a better built cotton module or body of compacted cotton.

DETAILED DESCRIPTION OF THE INVENTION

Figure 1:
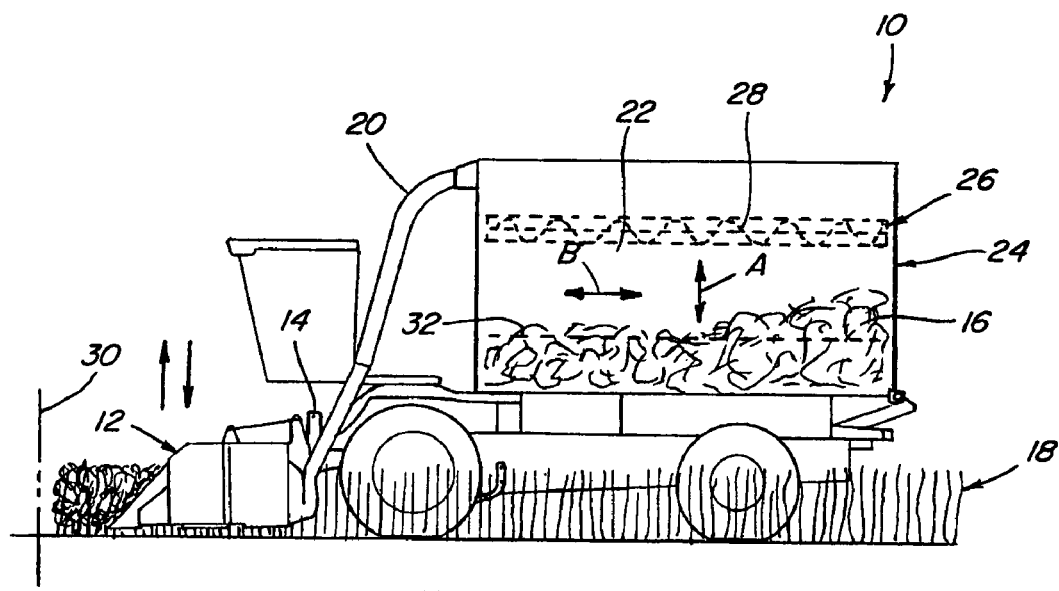
FIG. 1 is a simplified side view of a representative cotton harvesting machine, shown in a harvesting mode approaching an end of rows of cotton plants in a cotton field.

Referring now to the drawings, in FIG. 1, a representative cotton harvesting machine 10 including apparatus for an end of row detection and compacting process according to the present invention, is shown. Harvesting machine 10 generally includes a plurality of cotton harvesting or picker drums 12 extending across a forward end 14 of machine 10. Picker drums 12 are operable in the well known, conventional manner, for picking cotton from rows of cotton plants 18, as machine 10 moves forwardly along the rows through a cotton field. The harvested cotton 16 is conveyed through ducts 20 into an upper region of an interior 22 of a cotton receiver 24, which can be a conventional basket, compacting chamber, module builder, or the like. Compactor apparatus 26 which can be of conventional, well known construction, is located in the upper region of interior 22, and is supported by fluid cylinders or the like, for upward and downward compacting movement, denoted by arrow A, in a lower region of interior 22, for compacting cotton 16 contained therein. Compactor apparatus 26 preferably includes at least one auger 28 rotatable in opposite directions, as desired or required, for distributing cotton 16 in interior 22, as denoted by arrow B.

Typically, during the normal picking process, picker drums 12 are in the lowered position shown. The compacting process is typically initiated from one of three conditions: (1) auger pressure exceeding a threshold limit; (2) a yield signal for cotton coming into the receiver 24 reaches a set point; and (3) a timer exceeds a count value which is a variable (for operators without a yield sensor) set by the operator who determines a yield setting for the field conditions. However, when machine 10 reaches the end of the row or rows of cotton plants 18 being currently picked, picker drums 12 are typically raised to a point which shuts off the counter.

According to the present invention, it is at this location, namely, end of row 30, and using a convenient indicator, such as a position signal for picker drums 12, indicating that they are in an elevated, non-picking position, that a process for additional compacting of cotton 16 and interior 22 is automatically initiated. The compacting process preferably comprises repeated cycling of the compactor apparatus 26 upwardly and downwardly in direction A against the cotton, to compact the cotton uniformly in the bottom of interior 22, as generally denoted by line 32.

Figure 2:
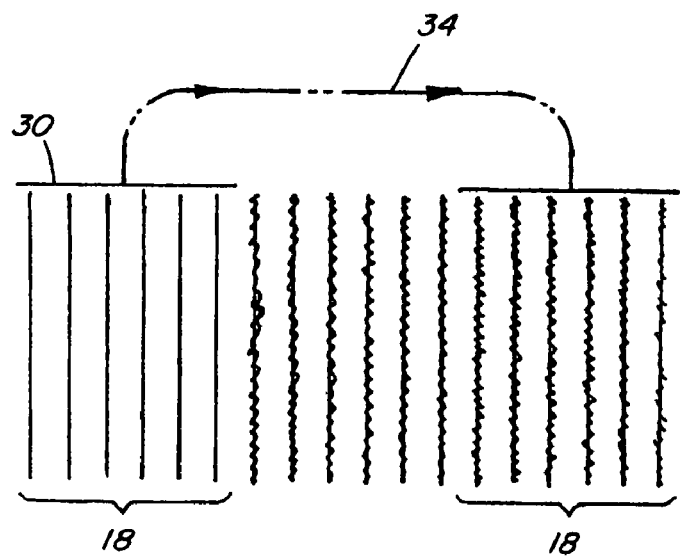
FIG. 2 is a simplified schematic top view of the rows, and showing a typical path for a turning maneuver of the harvesting machine at the end of the rows for aligning the machine with subsequent rows to be harvested.

Referring also to FIG. 2, a typical path of movement 34 of harvesting machine 10 from line 30 at the end of harvested rows 18 to line 30 for entering another swath of rows 18, is shown. Compactor apparatus 26 is moved upwardly and downwardly according to the process of the invention as denoted by arrow A during substantially the entire time that machine 10 moves along path of movement 34, and then ceases as picker drums 12 are lowered to their picking position (FIG. 1) and harvesting is resumed. The normal compacting process involving operation of augers 28 in one or both directions, as denoted by arrow B, is resumed, as is periodic upward and downward compacting movement as denoted by arrow A.

Figure 3:
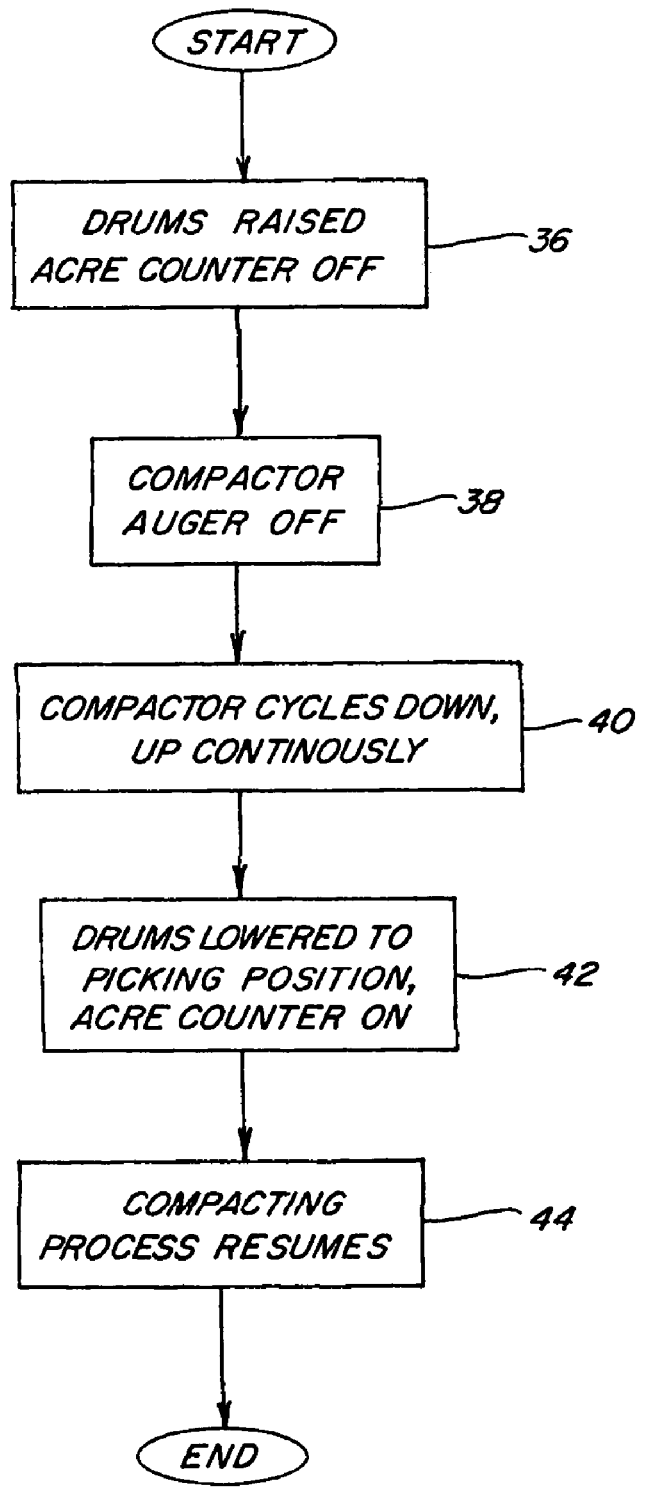
FIG. 3 is a high level flow diagram showing steps of operation of a end of row detection and compacting process according to the invention.

FIG. 3 is a high level flow diagram showing steps for an automatic end of row detection and compacting process according to the invention. At step 36, at the end of the rows, denoted by line 30, (FIG. 1) the operator raises the picker drum, which turns the acre counter off. The raising of the drums and turning of the acre counter off, is used to turn off compactor auger 28, is denoted at step 38. Compactor apparatus 26 is now cycled up and down, denoted by arrow A (FIG. 1), continuously as machine 10 proceeds along path 34, to better compact cotton 16 in interior 22. Then, when the end of path 34 is reached and machine 10 is aligned with new rows of cotton plants 18 and drums 12 are lowered to their picking position and the acre counter is turned on, as denoted at FIG. 42, the compactor cycles of step 40 are discontinued, and the normal compacting process resumes, as denoted at step 44. This sequence of steps can then be repeated when machine 10 reaches the end of the new rows of cotton plants 18 in the above-described manner.

Figure 4:
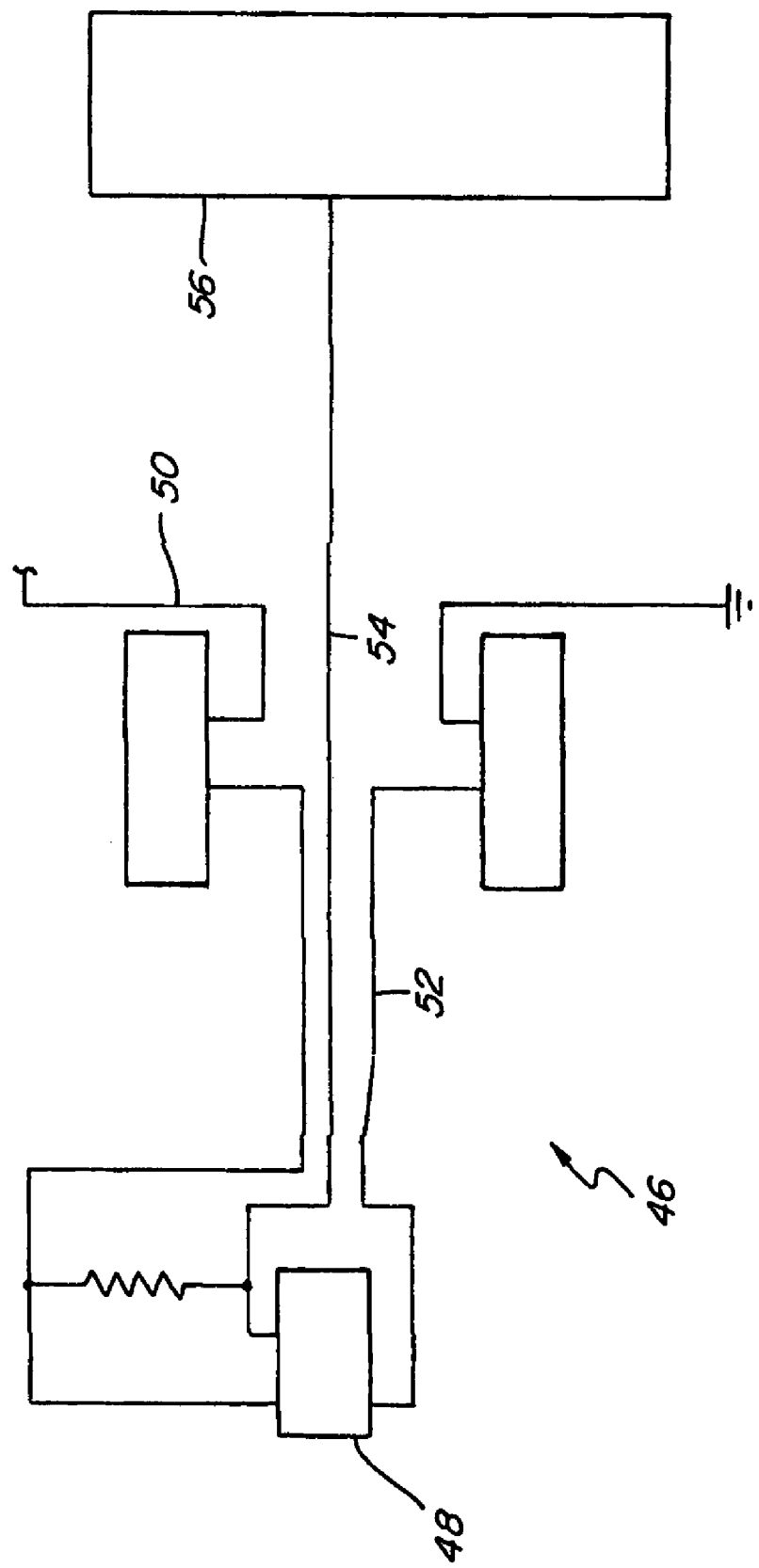
FIG. 4 is a schematic representation of an end of row detection circuit for the invention.

FIG. 4 is a schematic circuit diagram 46 showing circuitry and apparatus for a position sensor for detecting when picker drums 12 are in their raised position, for automatically initiating the end of row detection and compacting sequence of the invention. Circuit 46 includes an optical sensor 48 having a contact connected to a DC power source by a conductive path 50 and a contact connected to ground by a conductive path 52, such that, when sensor 48 is closed, which denotes raising of the drums, power is outputted along a conductive path 54 to a switch 56 for ceasing or locking out operation of auger or augers 28, and commencing the end of row compacting sequence. Then, when lowering of the drums is detected by sensor 48, the power output on conductive path 54 to switch 56 is interrupted, such that operation of augers 28 and normal compacting operation can be resumed.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A method of operation of compactor apparatus in a cotton receiver of a cotton harvesting machine, comprising a step of:
    responsive to raising of at least one picker drum of the harvesting machine from a harvesting position to a non-harvesting position, automatically operating the compactor apparatus in a compacting mode wherein the compactor is cyclically moved downwardly against cotton accumulated in the receiver, and moved upwardly from the accumulated cotton.

2. The method of claim 1, comprising a further step of:
    responsive to lowering of the at least one picker drum from the non-harvesting position to the harvesting position, automatically ceasing operation of the compactor apparatus in the compacting mode.

3. The method of claim 1, comprising an additional step of ceasing operation of at least one auger of the compactor apparatus responsive to the raising of the at least one picker drum from the harvesting position to the non-harvesting position.

4. The method of claim 1, comprising a step of providing a sensor operable for sensing raising of the at least one picker drum of the harvesting machine from the harvesting position to the non-harvesting position and outputting a position signal representative thereof.

* * * * *